3,060,198
Patented Oct. 23, 1962

3,060,198
TETRACYANOFURAN
Claus D. Weis, Wilmington, Del., assignor to E. I. du Pont de Nemours and Company, Wilmington, Del., a corporation of Delaware
No Drawing. Filed Oct. 6, 1959, Ser. No. 846,070
1 Claim. (Cl. 260—346.1)

This invention relates to novel heterocyclic compounds, and especially to novel heterocyclic compounds having a plurality of cyano substituents directly attached to the heterocyclic ring. More particularly, the invention relates to tetracyanofuran as a new compound, to a novel method for preparing the new compound, and to novel precursor compounds which are produced as intermediates in the preparation of tetracyanofuran.

Tetracyanofuran is a derivative of furan wherein the 4-ring hydrogens are replaced with cyano groups. The compound may be represented as follows:

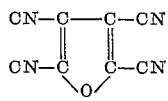

The principal object of the present invention is to prepare tetracyanofuran. Another object of the present invention is to provide a novel method for preparing tetracyanofuran which is convenient and economical. A still further object of the present invention is to prepare novel intermediate compounds which are useful, not only in the preparation of the tetracyanofuran, but which have independent utility in other connections as well. These and other objects will become apparent from a consideration of the ensuing specification and claims.

The foregoing objectives are achieved by the reaction of a tetra-substituted furan having at least two carbalkoxy substituents with ammonia to prepare the corresponding carbamoyl compound which, in turn, is dehydrated with phosphorous oxychloride to produce the tetracyanofuran. More specifically, the tetra-substituted furan starting material has 2 to 4 carbaloxy ring substituents, the remaining ring substituents, where there are any, being cyano groups provided, however, that no cyano substituent is attached to a ring carbon atom directly adjacent to the oxygen atom of the furan ring. For example, a tetracarbalkoxy-furan or a 3,4-dicyano dicarbalkoxy furan may be reacted with ammonia to convert the carbalkoxy groups to carbamoyl groups. The intermediate compounds produced in each instance may then be dehydrated to produce 2,3,4,5-tetracyanofuran.

A more complete understanding of the invention will be gained from a consideration of the following examples.

EXAMPLE I

Preparation of Tetracyanofuran from Tetracarbethoxyfuran

A mixture containing 150 parts of crude tetracarbethoxyfuran suspended in a 1:1-by-volume solution of methyl alcohol and concentrated ammonium hydroxide was saturated with gaseous ammonia at ice-bath temperature. After stirring for twenty-four hours, the solid product was removed by filtration and washed successively with water, methanol, acetic acid and finally with methanol. The solid was dried over phosphorous pentoxide and potassium hydroxide, giving 95 parts of dry product. The impure compound did not melt but became slightly yellow about 280° C. and black at about 310° C. Chemical and spectrophotometric analyses indicated the product to contain 2,3,4,5-tetracarbamoylfuran. Analysis of this product follows:

Analysis.—Calcd. for $C_8H_8N_4O_5$: C, 40.44%; H, 3.33%; N, 23.32%. Found: C, 39.73%; H, 4.12%; N, 22.49%.

The tetracarbethoxyfuran starting material was obtained by condensing ethyl sodiooxaloacetate in chloroform in the presence of bromine to yield the β-ketonic ester which was then furanized with sulfuric acid to tetracarbethoxyfuran, as described in detail by Reichstein et al., Helv. Chim. Acta 16, pg. 276 (1933).

A sample (10 parts) of the crude tetracarbamoylfuran was then dispersed in an excess of phosphorus oxychloride and refluxed for 3½ hours. The hot mixture was poured onto ice, and after two hours the solid material was filtered off. The solid was extracted with methanol, and the filtrate was decolorized with charcoal. On crystallization, the filtrate yielded colorless crystals, which, after drying thoroughly with air melted over the range 123-4° C. The product was identified as tetracyanofuran. Analysis of this product follows:

Analysis.—Calcd. for $C_8N_4O$: C, 57.15%; N, 33.33%. Found: C, 56.73%; N, 33.42%.

EXAMPLE II

Preparation of Tetracyanofuran from 2,5-Dicarbethoxy-3,4-Dicyanofuran

A. Preparation of the disodium salt of diethyl 2,5-dioxo-3,4-dicyanoadipate.—To a dispersion containing 52 parts of sodium hydride in 176 parts of benzene was added with stirring 160 parts of diethyl oxalate, and the mixture was warmed to 55° C. Without further heating, a solution of 40 parts of succinonitrile in 308 parts of benzene was added with stirring over a period of three hours. After the addition was complete, the mixture was stirred for one hour. Ether was added, and the bright yellow precipitate was removed by filtration. The precipitate was dried under vacuum. Analyses indicated the powder to contain the disodium salt of diethyl 2,5-dioxo-3,4-dicyanoadipate.

B. Preparation of 2,5-dicarbethoxy-3,4-dicyanofuran.—To a solution containing 64.8 parts of an impure sample (containing about 50% by weight) of the disodium salt of diethyl 2,5-dioxo-3,4-dicyanoadipate, 213 parts of ether and 0.5 part of pyridine was added, over a fifteen minute period, a solution containing 24 parts of thionyl chloride in 71 parts of ether. After the addition was complete, the mixture was refluxed for two hours. The mixture was filtered while still warm, and the residue was extracted twice with ether. The combined extracts were neutralized with an aqueous solution of sodium bicarbonate, washed with water and dried over sodium sulfate. Evaporation of the ether yielded 20 parts of impure 2,5-dicarbethoxy-3,4-dicyanofuran. Recrystallization from dilute ethanol gave 12.5 parts of white crystals of the compound which after drying melted over the range 86.5–87.5° C. Chemical and spectrophotometric analyses confirmed its composition and structure.

Analysis.—Calcd. for $C_{12}H_{10}N_2O_5$: C, 54.96%; H, 3.85%; No. 10.74%. Found: C, 54.94%; H, 3.77%; N, 10.83%.

C. Preparation of 2,5 - Dicarbamoyl - 3,4 - Dicyanofuran.—A mixture containing 26 parts of the 2,5-dicarbethoxy-3,4-dicyanofuran dispersed in 135 parts of methyl alcohol was treated with 75 parts of an aqueous 25% ammonium hydroxide solution. The mixture was then stirred for fifteen minutes while being cooled in a cold water bath. The precipitate was filtered off and washed with ether. 2,5-dicarbamoyl-3,4-dicyanofuran was obtained in good yield (15 parts). The compound did not melt but slowly decomposed above 200° C. Chemical analyses and infrared examination confirmed its composition and structure.

Analysis.—Calcd. for $C_8H_4N_4O_3$: N, 27.45%. Found: N, 26.95%.

D. *Preparation of Tetracyanofuran.* — A dispersion containing 4.08 parts of 2,5-dicarbamoyl-3,4-dicyanofuran and 6 parts of phosphorus oxychloride was treated with 10 parts of pyridine, and the mixture was stirred without external heat until the solid dissolved. Upon standing, the entire mixture solidified. Water was added (80 parts), and after two hours, the solid residue was filtered off. The solid was dried over phosphorus pentoxide, yielding 2.78 parts of slightly brownish crystals. Charcoal decolorization and recrystallization from methanol gave colorless crystals which after drying, melted over the range 123–4° C. The product did not depress the melting point of the tetracyanofuran obtained in Example I and the infrared spectra of the two samples were superimposable.

EXAMPLE III

*Preparation of Tetracyanofuran from 2,3,4,5-Tetracarbamoylfuran*

A dispersion of 24 parts of tetracarbamoylfuran (prepared as described in Example I) in 125 parts of phosphorus oxychloride was heated at reflux for three hours. The excess phosphorus oxychloride was removed under vacuum at ordinary temperatures and the residue was decomposed with ice at such a rate that the temperature did not exceed 15° C. The mixture was allowed to stand an additional thirty minutes in an ice bath, and the light yellow crystals which deposited were filtered off. The filtrate was continuously extracted with ether for four hours. Evaporation of the ether yielded a second crop of yellowish crystals. The crystalline fractions were combined and dissolved in hot benzene, and the mixture was filtered. Evaporation of the benzene gave 11.5 parts of colorless crystals, identified as tetracyanofuran. The product was purified further by recrystallization several times from methanol. This product was identical with recrystallized samples of the tetracyanofuran obtained in Examples I and II.

According to the present invention, it is possible to prepare tetracyanofuran from a tetra-substituted furan having at least two carbalkoxy substituents on the furan ring. The tetra-substituted furan starting material may have two, three, or four carbalkoxy substituents. If it has less than four of the latter, the remaining substituent or substituents are cyano groups provided, however, that no cyano group is attached to a ring carbon atom directly attached to the oxygen atom of the furan ring. The starting material is treated with ammonia to produce in each instance the corresponding carbamoyl compound which is then, in turn, dehydrated to obtain the tetracyanofuran.

Tetracyanofuran is a new compound and its preparation is the principal objective of the present invention. Various of the intermediate compounds which may be produced enroute to tetracyanofuran in accordance with the invention, however, are themselves new compounds which in some instances, exhibit independent utility. Therefore, in the broadest sense, the new compounds of the present invention may be represented by the following generic formula:

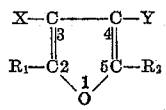

wherein "X" and "Y" are each either cyano, carbalkoxy, or carbamoyl groups; "$R_1$" and "$R_2$" are always alike and are likewise either cyano, carbalkoxy or carbamoyl groups; provided, however that when "$R_1$" and "$R_2$" are carbalkoxy groups, "X" and "Y" are either both cyano radicals or one of them is a cyano radical and the other is a carbalkoxy group; provided further that when "$R_1$" and "$R_2$" are carbamoyl groups, "X" and "Y" are either both cyano radicals, both carbamoyl groups, or one is a cyano radical and the other is a carbamoyl group; and provided further that when "$R_1$" and "$R_2$" are both cyano groups, "X" and "Y" are both cyano groups. Thus the present invention embraces the following new compounds:

(1) 2,5-dicarbamoyl-3,4-dicyanofuran:

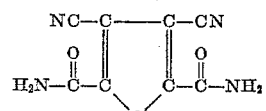

(2) 2,5-dicarbalkoxy-3,4-dicyanofuran:

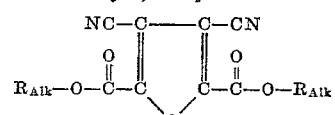

(3) 2,3,4,5-tetracyanofuran:

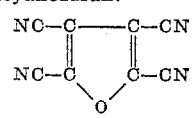

(4) 2,3,4,5-tetracarbamoylfuran:

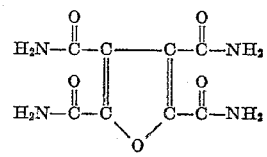

(5) 2,4,5-tricarbalkoxy-3-cyanofuran:

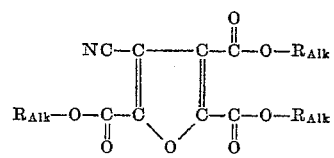

(6) 2,4,5-tricarbamoyl-3-cyanofuran:

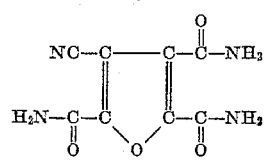

Suitable starting materials for the tetracyanofuran synthesis of the present invention are the tetra-substituted furans having at least 2 carbalkoxy substituents; the other ring positions being occupied by either carbalkoxy or cyano radicals. The carbalkoxy groups are preferably those of the lower alkyls such as carbomethoxy and carboethoxy radicals. Thus the tetracyanofuran may be synthesized from 2,3,4,5-tetracarbomethoxyfuran, 2,3,4,5-tetracarbethoxyfuran, 2,5 - dicarbomethoxy-3,4-dicyanofuran, 2,5-dicarbethoxy-3,4-dicyanofuran, 2,4,5-tricarbomethoxy-3-cyanofuran, 2,4,5-tricarbethoxy-3-cyanofuran, alkyl homologs of such compounds, and the like. If desirable, however, the novel compounds of the present invention which contain carbalkoxy radicals may also be prepared with the higher alkyl radicals having three or more carbon atoms. Generally speaking, therefore, the precise nature of the alkyl radical in the carbalkoxy-substituted furans is in no sense critical to the invention.

The ammonolysis of the carbalkoxy-substituted furans may be conveniently carried out in an ammoniacal aqueous methanol medium. Such an ammonolysis medium offers the advantage of acting as a solvent for the starting material while at the same time providing a reaction medium from which the intermediate carbamoyl products precipitate as insoluble products. The latter is thus obtained in a relatively pure form eliminating the necessity of providing cumbersome and costly purification steps. Other ammonolysis procedures may be used, however, and in this connection the ammonolysis may be carried out in various other media such as aqueous ammonia, anhydrous methanolic ammonia and the like.

The time required for the ammonolysis of the carbalkoxy-substituted furan compounds depends not only upon the choice of reaction medium but also upon the particular reactants and the reaction products in each instance. Reaction times may thus vary anywhere from ten minutes to ten hours, or longer. Generally, it has been found that as carbalkoxy groups on the furan ring are replaced by cyano groups shorter reaction times are required; for example, of the order of ten to thirty minutes for the dicyanodicarbalkoxy compounds. The tetracarbalkoxyfurans are less reactive and, even in the aqueous ammonolysis media, generally require six hours or more for complete reaction. Ammonolysis usually proceeds more rapidly in aqueous reaction media than in anhydrous systems.

The ammonolysis reaction is preferably carried out within the temperature range of 0–50° C., although the reaction proceeds at temperatures of —10° C. or lower. The desired temperatures are usually maintained by cooling the reaction vessel in ice or cold water. Temperatures greater than 50° C. may be used if desired, i.e. moderate temperatures up to about 100° C. although at higher temperatures the reaction proceeds very rapidly and is difficult to control leading to loss of some of desired product.

The polycarbamoyl products are readily converted to the corresponding polycyano compounds by dehydration. A suitable dehydrating agent is phosphorus oxychloride. The amount of the phosphorus oxychloride employed for the reaction is not critical. When large excesses are employed, the oxychloride serves both as a dehydrating agent and an active solvent for the product. After the reaction has progressed to completion the excess reagent may be removed by distillation under vacuum. Stoichiometric quantities of the oxychloride, i.e., one mole of phosphorus oxychloride per carbamoyl group, are also operable in the process without detriment to the product yield. Inert diluents may be employed, too. In the absence of an active solvent for the product, the tetracyanofuran may be recovered from the reaction mass by selective extraction.

It is within the scope of this invention to employ in the dehydration step of the process reaction accelerators such as pyridine. The polycarbamoyl compounds tend to dehydrate rather slowly, and accelerators, such as pyridine, to speed up the dehydration will be useful (though not required) in many instances. One mole of pyridine for each mole of hydrogen chloride produced in the reaction is preferred. Although smaller quantities are permissible, large excesses of pyridine are to be avoided to prevent undesirable side reactions involving the cyano group.

The dehydration reaction takes place at slightly elevated temperatures, and although the reaction is somewhat exothermic, it is usually desirable to apply external heat. Preferred reaction temperatures are within the range, 50–110° C. Higher and lower temperatures are operable, however, although temperatures should be maintained below the decomposition temperatures of product and/or reactants.

Tetracyanofuran is a colorless, crystalline compound, useful in the preparation of a number of valuable products. For example, tetracyanofuran reacts with 2-aminobenzothiazole, in a one-to-four molar proportion in trichlorobenzene at 155° C. to produce a yellow-green pigment. The pigment is insoluble in all common reagents and absorbs strongly in the visible spectrum with three maxima in the 400–450 millimicron range. The pigments and a suitable method for their preparation, are fully described in copending application, Serial No. 846,071 filed October 6, 1959, in the name of Howard E. Simmons, and having a common assignee with the present invention. Tetracyanofuran also forms pigments with phenylhydrazines. Reduction of tetracyanofuran provides polyaminofurans, useful as curing agents for epoxy resins. The amines also react with dibasic acids such as adipic or sebacic acids to produce polyamides. The carbalkoxy and dicyanodicarbamoyl furans, in addition to being useful as intermediates in the synthesis of tetracyanofuran, have other valuable applications. The carbalkoxy compounds are useful in the preparation of polyesters by ester interchange with alcohols such as ethylene glycol. Tetracyanofuran also is an effective fungicide against early tomato blight and is useful as an insecticide, especially in the control of mites.

The invention has been described in the foregoing specification. It will be readily apparent to those skilled in the art that many variations may be made in the procedures and compositions described without departing from the spirit of the invention. I intend, therefore, to be limited only by the following claim.

The compound of the formula

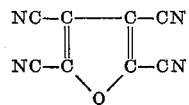

References Cited in the file of this patent

UNITED STATES PATENTS

| | | |
|---|---|---|
| 2,745,845 | Jones et al. | May 15, 1956 |
| 2,769,818 | Schlesinger | Nov. 6, 1956 |
| 2,772,295 | Burness | Nov. 27, 1956 |
| 2,799,697 | Maxion | July 16, 1957 |
| 2,802,857 | Kesslin et al. | Aug. 13, 1957 |
| 2,834,789 | Clausson-Kaas | May 13, 1958 |

OTHER REFERENCES

Degering: An Outline of Nitrogen Compound (1950), p. 504.

Wagner et al.: Synthetic Organic Chemistry (Wiley, 1953), p. 596.

Schmidt: Organic Chemistry (7th ed. 1955), pp. 224 and 353–4.